United States Patent [19]
Saulsman

[11] 3,811,085
[45] May 14, 1974

[54] CONTROLLED POWER SOURCE WITH APPARATUS AND METHOD INCLUDING INDICIA OF CONTROL MEANS ACTUATION AT OPERATIONAL LOCATIONS SELECTIVELY SPACED FROM SOURCE, AS FOR, BUT NOT LIMITED TO, WELDING OPERATIONS

[76] Inventor: Jack C. Saulsman, 12105 Carlsbad, Houston, Tex. 77045

[22] Filed: July 3, 1972

[21] Appl. No.: 268,784

[52] U.S. Cl. .................................. 322/16, 219/132
[51] Int. Cl. .................................................. H02p 9/04
[58] Field of Search ........ 322/16; 219/131 R, 131 F, 219/132, 136

[56] References Cited
UNITED STATES PATENTS

| | | | |
|---|---|---|---|
| 2,734,116 | 2/1956 | Rybolt | 322/16 X |
| 3,041,526 | 6/1962 | Rybolt | 219/132 X |
| 3,402,341 | 9/1968 | Cook | 322/16 |

Primary Examiner—A. D. Pellinen
Assistant Examiner—Harry E. Moose, Jr.
Attorney, Agent, or Firm—Ranseler O. Wyatt

[57] ABSTRACT

There is disclosed an operative, manipulated at a production station, and a control housing easily and readily mechanically connected to a conventional regulatable source of power, as a welding machine. The control housing has incorporated therein an actuator including circuitry, as with a fractional horse power motor being connected through a transmission to drive the means that regulates the power delivered from the source. In one form of the invention the circuitry includes a single conductor, and in another form, not more than two conductors. With conductor wire connected switch operator manipulated at his work station, he sets in actuation change of power delivered to his station, with change achieved being indicated to him in one form visually by performance, in another form by count of length of switch closure, in another form by count of successive switch closures, and in still another form by count of audible clicks or "beeps" indicative of steps effected in power regulation at source.

12 Claims, 12 Drawing Figures

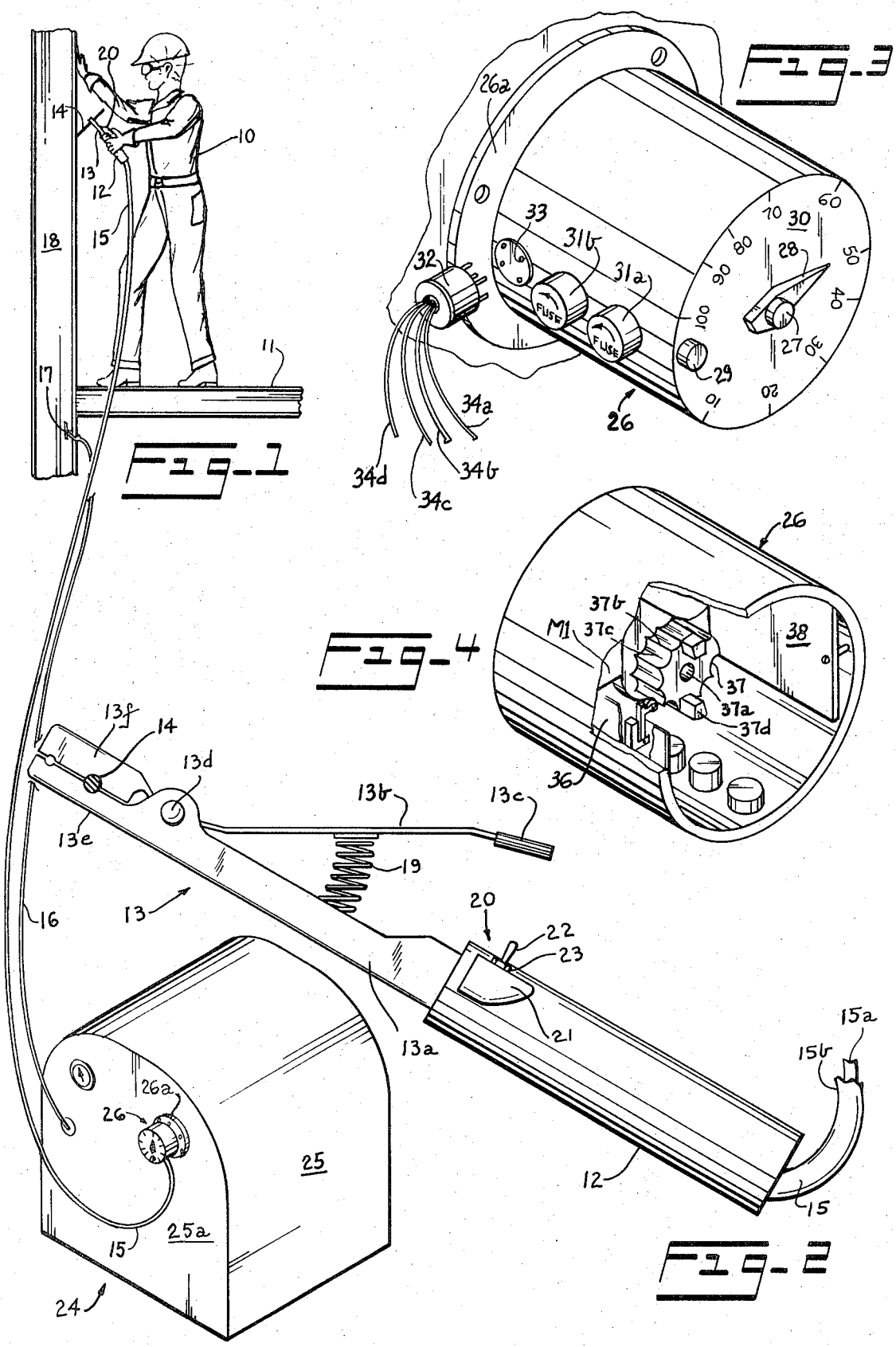

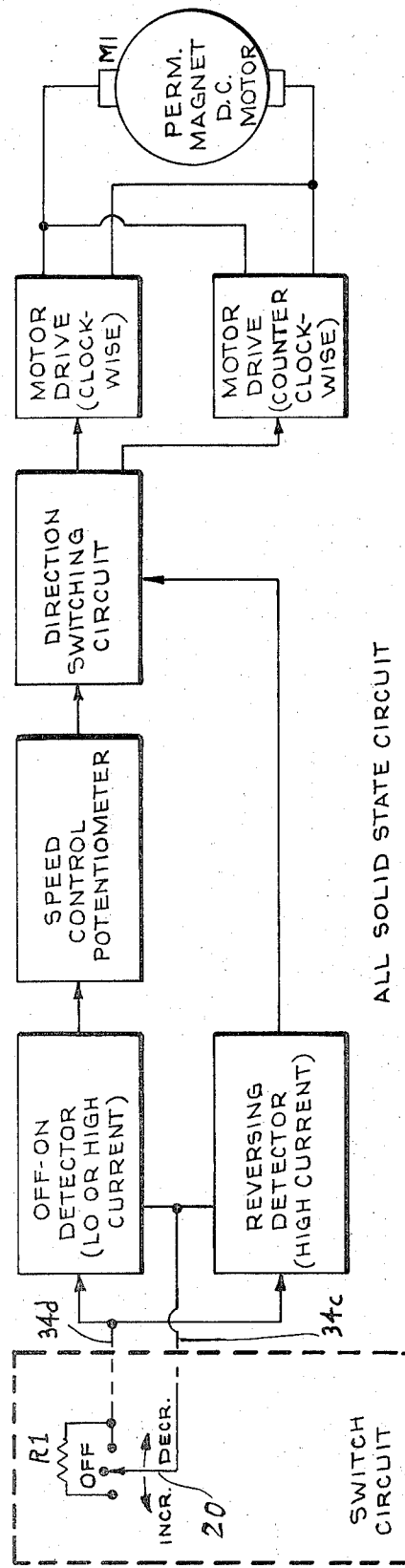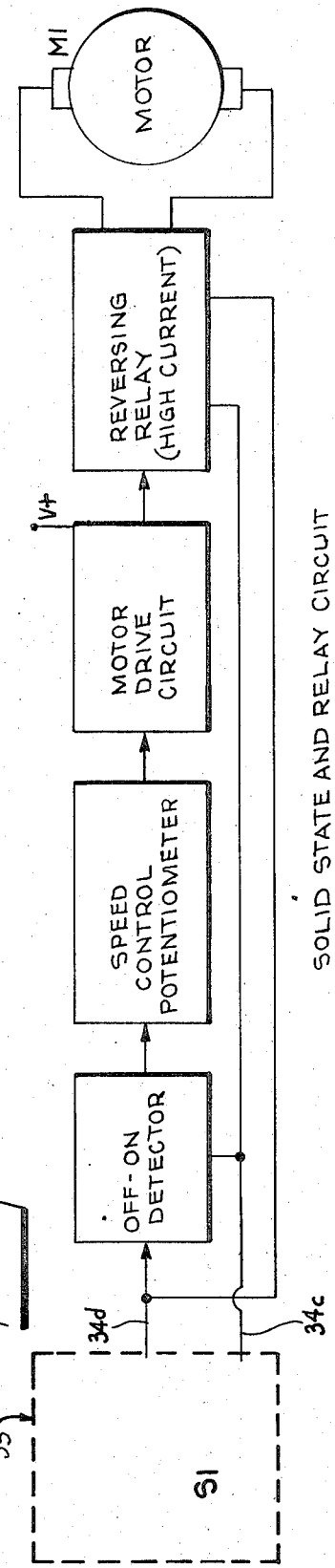

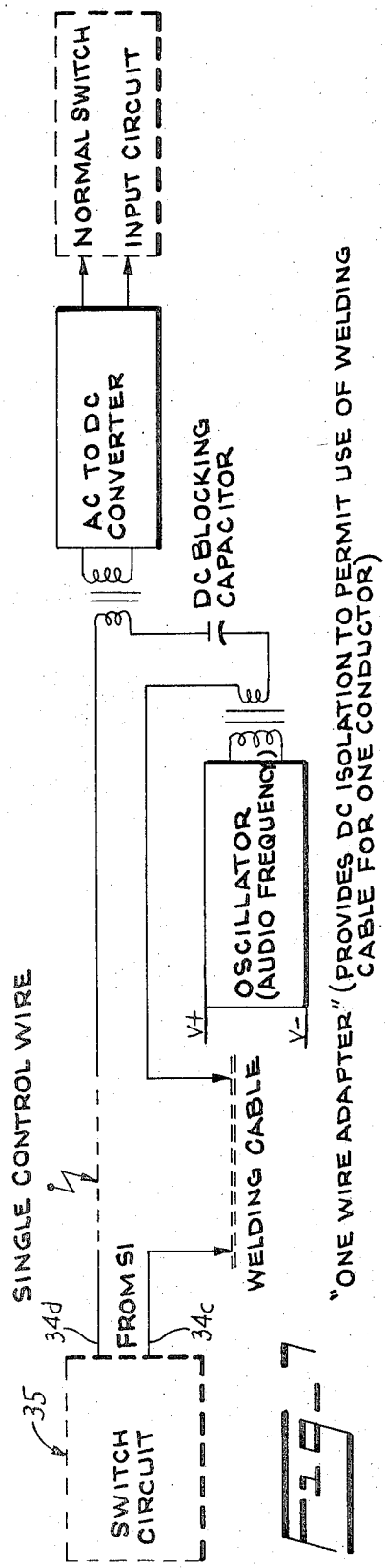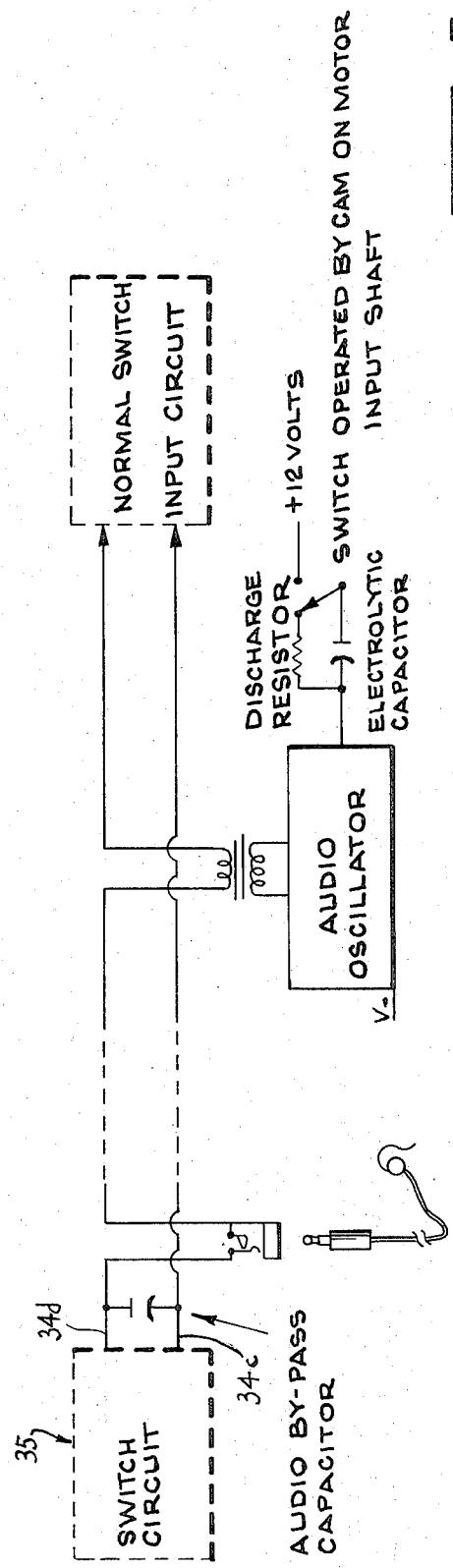

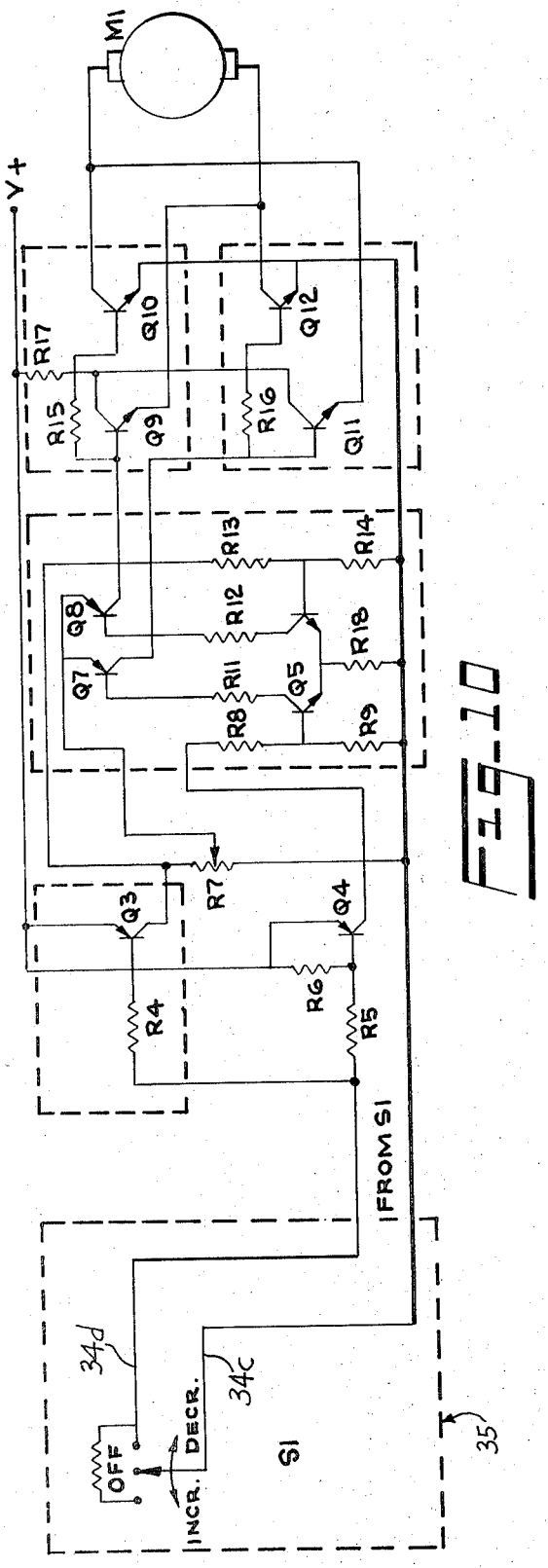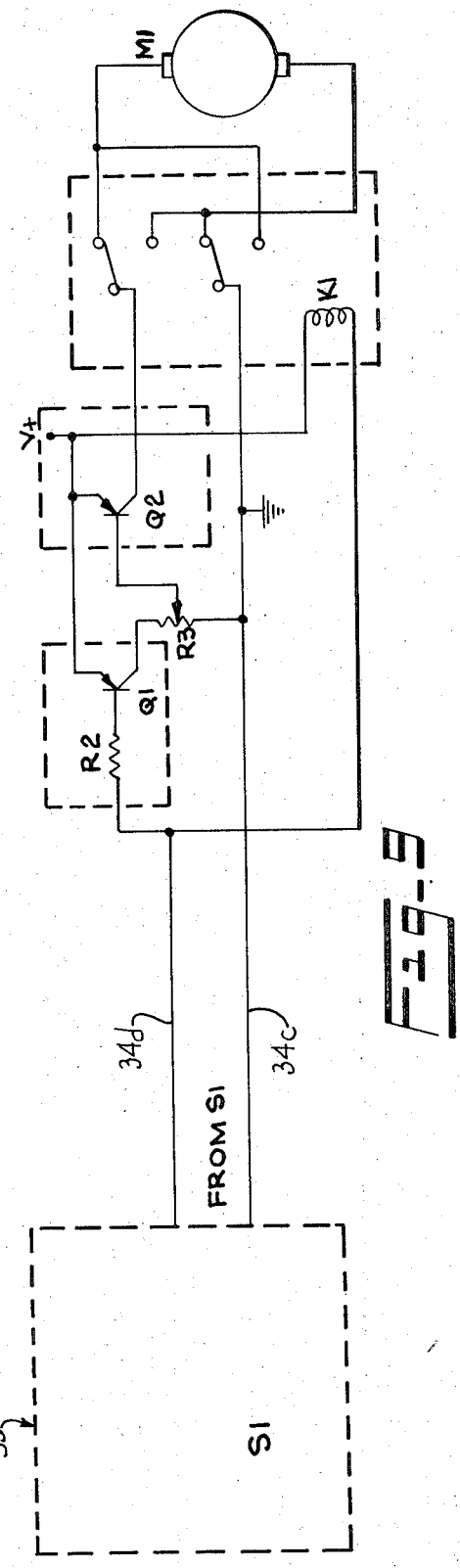

CONTROLLED POWER SOURCE WITH APPARATUS AND METHOD INCLUDING INDICIA OF CONTROL MEANS ACTUATION AT OPERATIONAL LOCATIONS SELECTIVELY SPACED FROM SOURCE, AS FOR, BUT NOT LIMITED TO, WELDING OPERATIONS

BACKGROUND OF THE INVENTION

Where a power source is adjustable to deliver power in degree, as at stations spaced therefrom, present usage, especially in the case of welding machines, requires that the operator go back to the source of power each time that it has to be adjusted as to the power it is desired that it deliver. Devices seeking to remedy this time loss to operator by adjustment actuated means at selective working stations, have usually failed to solve problems associated with the "shorting out" of the control device.

The prior art, from Leppala, U.S. Pat. No. 2,872,566, for control for Arc Welders; to Rybolt U.S. Pat. No. 3,041,526, for Controller for Motor Driven Welder Generators; on to Cook, U.S. Pat. No. 3,402,341, for Remote Control Systems for Welding Generator; and lately to Weems, U.S. Pat. No. 3,477,005, for Remote Amperage Control Drive for Electric Welders; successively disclose means directed to solve the problem of the operator having to return to source to make adjustment in degree of power desired to be delivered. However, upon best information and belief, no device is now being marketed with such success as to have arroused any great acclaim by the trades, a major objection being that shorting occurs between the source of electrical power delivered by the machine for operation, and the source of power for remote control adjustment. Also, in most cases, even where remote control adjustment is endeavored, time loss is involved by the operator having to interrupt his operation temporarily, while making remote control adjustment.

SUMMARY OF THE INVENTION

This invention relates to means and method, effective for sustained continuous operation, for changing the intensity of operative force or power applied at a remote point by intensity adjustment means at such remote point calculated by local observation, timed manipulation, counted manipulations, or audio counted responses.

It is thus a primary object of the invention to provide means and method, effective for sustained continuous operation, for changing the intensity of operative force or power to be brought into play at selective points, as remotely spaced from the source of power, such change being calculatable at the selective points, as by local observation, operator timed manipulation, counted sensed manipulations, or audio counted responses.

It is also an applied object of the invention to provide means and method of this class in which the source of power delivered by an arc welding machine is adjusted by operator at selective spaced working stations therefrom, by means of operated timed means or operator counted sensed means preferable disposed upon welding electrode holder, by audio counted responses through ear phone.

It is also another object of the invention to provide means and method of this class whereby the speed of response to adjustment may be selectively set at source of power prior to operation at selective points spaced therefrom.

It is further object of the invention to provide means and method of this class whereby a fractional horse power motor responds to circuit closure at selective spaced stations to effect change in operative power, the motor being of preselected capacity to stall either end of power change range, thereby eliminating necessity for terminal travel control switches, and the like.

It is an additional object of this invention to provide means and method of this class in which, at operational locations, the timed manipulation, or counted manipulation means of calculating change in power or force delivered from source, may require no more than one conductor wire in addition to operational equipment, as the cable to electrode.

It is a further object of this invention to provide means and method of this class in which, at operational locations, audio counted responses permit calculating change in power or force delivered from source, with two conductor wires being required, in addition to operational equipment, as the cable to electrodes.

It is another and special object of the invention to provide means and method of this class in which the actuator to effect change of power at source, or rate of delivery of operatioanl material from source, comprises a housing readily installable to extend outwardly, the housing, as a unit, mounting therewithin a fractional horse power motor and transmission, and essential circuit.

It is another and further specific object of the invention to provide actuator means and method of this class, with actuator means at source controllable from remote stations to change delivery of power and/or operational material, the actuator means comprising a readily installable outwardly extending unit, for installation, for example, upon hetio-arc, short arc, and automatic type welding machines operational gas delivery sources, and welding wire from rolls.

It is also a further object of the invention to provide means and method of this class in which all control circuitry within the control housing may be solid state circuitry.

It is yet a further object of the invention to provide means and method of this class in which all control circuitry, except for a reversing relay, may be solid state circuitry.

It is yet an additional object of the invention to provide means and method of this class in which the change of power be delivered from source may be sensed by audible means, with music being alternatively selected for audition when not sensing.

It is still another and additional object of the invention to provide means and method of this class which provides circuitry designed for substantial elimination of the occurrence of "shorts" through one source of power conflicting with another source of power, as in welding.

Other and further objects will be apparent when the specification hereinafter to be set forth is considered in connection with the description of views and details of construction disclosed therein.

BRIEF DESCRIPTION OF THE DRAWINGS

In the accompanying drawings forming a part of this specification and wherein like reference numerals are employed to designate like parts:

FIG. 1 illustrates a particular application of the invention, with welder operating spaced from a welding machine, the face of which he cannot see, it being indicated diagrammatically that any control circuitry, actuated by switch closure of the switch on the electrode holder, is enclosed in the welding cable that carries welding power to the electrode.

FIG. 2 is a large scale view of a conventional welding electrode holder, with welding electrode or welding rod therein, with the control circuitry toggle type switch included by the invention, being shown affixedly mounted on the electrode holder handle.

FIG. 3 is an isometric view of an actuator housing mounted to extend outwardly co-axially of a welding machine rheostat shaft.

FIG. 4 is an isometric view of an actuator housing, as shown in FIG. 3, with part of the housing shown cut away, thus to reveal interior parts and arrangements.

FIG. 5 is a block diagram of control circuitry, whereby upon selectively directional switch closure, (as on remotely spaced electrode holder handle,) solid state circuitry, in part with reversing relay, carries out power adjustment actuation and control.

FIG. 6 is a block diagram of control circuitry, whereby upon selectively directional switch closure, (as on remotely spaced electrode holder handle,) all solid state circuitry carries out power adjustment actuation and control.

FIG. 7 is a block diagram of control circuitry, insertable between either of circuitry of FIG. 5 or circuitry FIG. 6, and remotely located switch, provides D.C. isolation to permit use of welding cable for one conductor.

FIG. 8 is a block diagram of control circuitry, insertable between either circuitry of FIG. 5 or circuitry of FIG. 6, and remotely located switch, provides momentary audio tone signals at intervals of motor rotation.

FIG. 9 is an electrical detail diagram of the circuitry shown in block diagram in FIG. 5.

FIG. 10 is an electrical detail diagram of the circuitry shown in block diagram in FIG. 6.

BRIEF DESCRIPTION OF THE INVENTION

Figure 11:
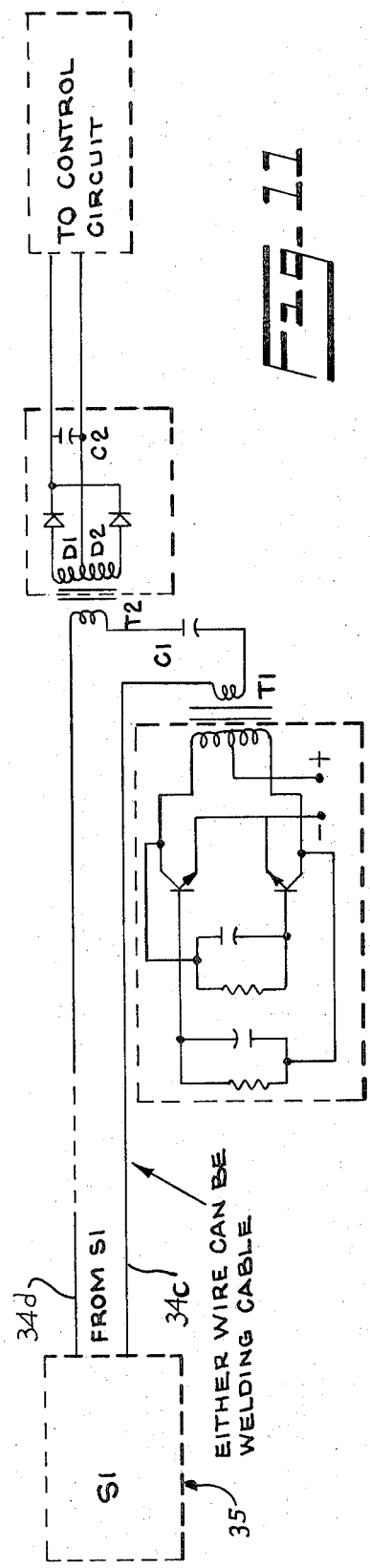
FIG. 11 is an electrical detail diagram of the circuitry shown in block diagram in FIG. 7.

Briefly the invention concerns the adaptation of a source of delivering power, as through conduits, conductors, flexible shafts and the like, to working stations spaced from the source, the means for controlling adjustment of power delivered being actuable from working station locations. In particular, in welding operations, the invention provides switch means, as upon a welding electrode handle, to be closed by operator, even as he continues welding, and through various indicia or sensing means, gauges when a proper desired adjustment in power delivery, has been put into effect back at the machine.

DETAILED DESCRIPTIONS OF PREFERRED EMBODIMENTS

Arc welding apparatus has been selected, as typical of usage of the inventions, a welder 10 being shown in FIG 1, standing on a beam or scaffold 11, holding the insulative material handle 12 of a welding electrode holder 13, which holds a welding rod 14 in position of welding a vertical seam, as to weld a structural wall plate, not shown, to a vertical column or beam 18. As is well known in welding practice the conventional arc welding machine 14, in FIG. 1, supplies either A.C. or D.C. voltage through two heavy, insulated cables 15, 16, respectively to electrode holder 13 and to a ground location 17, as below the scaffold 11 on the column or beam 18.

Conventional electrode holder structure is shown in FIG. 2, with a rigid, metallic holder bar 13a extending through the insulative handle 12, the positive conductor 15a, as of aluminum or copper, within the insulative cable sheath 15b, being connected electrically to the holder bar 13a by means, not shown, within the handle 13.

A lever 13b having an insulated tip 13c is pivotally mounted, as by a pivot rod 13d, to the holder bar 13a, with the lever jaw 13c thereof indented at spaced apart distances to correspond with opposed indentations on the holder bar jaw 13f. In FIG. 2 a conventional welding rod 14 is shown clasped in opposed indentations adjacent the pivot 13d. As is well known to the trade, welding rod conventionally can comprise a low carbon steel coated with a flux. The spring 19 urges the pivoted lever 13b from the holder bar 13a, and thus urges the opposed jaws 13e, 13f, tightly to grasp the welding rod 14, within the opposed indentations thereof. Obviously indentations cooperative in the opposed jaws 13e, 13f, may be so spaced, and directed at such angles, as to permit a wide range of welding rod sizes to be held directed through a wide range of angles.

A double action switch 20 having an insulative material switch cover 21, is shown in FIG. 2, with the toggle lever 22 of a toggle type switch body 23 upstanding from the cover 21. The body 23 is of large enough inner diameter or bore to receive the toggle lever 22 upwardly with substantial clearance therethrough, whereby to limit toggle lever movement in directions back and forth paralled with the longitudinal axis of the holder 13. As thus sized and disposed, the toggle lever 22 may be actuated by the welder 10, (as he continues welding), to close switch circuit, to be herein below described. This can be accomplished by manipulation of one finger, or preferably by thumb manipulation. The switch 20, as to internal operation, will be explained in detail by electrical diagram hereinbelow.

In the welding machine 24, shown in FIG. 1, it can be assumed that an electric generator under its hood 25 supplies voltage across the terminals of the cables 15, 16. A rheostat under the hood 25 adjusts generator delivered amperage in accordance with the angle at which an exteriorally accessible pointer, on typical machines, may be turned. The pointer is fixed to a shaft which extends, within the machine, to adjacency with the rheostat, and as the accessible pointer may be turned, a rheostat dial is correspondingly turned with the shaft to cut in and out resistance over the arcuate range, say 320 degrees, of the rheostat arch.

In the present invention, a housing 26 is provided, which by means of its flange 26a, is connected to a side of the hood 25. In such cases, the pointer, hereinabove described, is discarded, and mechanical connection with the shaft that mounts the rheostat dial is made, by a shaft that extends through the control housing 26. This shaft 27, FIG. 3, has an indicating arrow 28 on the outer end thereof, that is rotatable over the graduated face of the control housing 26, the graduations being over substantially 300 degrees, and corresponding with a range of from zero to 100 amperes. The shaft 27 with an included control knob on its outer end, as rotated in one direction or the other, respectively cuts in and out resistance of the machine rheostat, and gives visual indication, graduated in amperes, corresponding with the positions of the indicating arrow 28, of the ampereage delivered in correspondence with the graduated face 30.

As shown in FIGS. 1 and 3, the control housing 26 is affixed to the front 25a of the welding machine housing or hood 25, by a connection flange 26a. In the large scale view of FIG. 3 fuses 31a, 31b, and within the control housing 26 these fuses are appropriately installed in the circuitry best to prevent damage in the circuitry in case of shorts. A plug 32 is shown on the side of the control housing 26 near the connection flange 26a. The housing 26 provides receptacles 33 for the terminals of four conductors, shown entering the plug 32 in FIG. 3. Two of the conductors 34a, 34b, extend to the opposite terminals of a 12 volt battery or to a corresponding source of power, not shown. Also, one of the conductors 34c extends to, and electrically ties into the cable conductor 15a, FIG. 2, of the cable 15, shown in both FIGS. 1 and 2. The remaining conductor 34d extends as a separate, insulated conductor, either apart from, or taped to the cable sheath 15b, and connects to the side of the double acting switch 20 opposite the side thereof that is electrically connected, as within the holder 12, for electrical communication with the conductive elements, 15a, 13a.

A control knob 29 is shown in FIG. 3, which operates electronically, to be hereinbelow described, through circuitry within the control housing 26, to preset the speed at which the indicating arrow 28 responds to switch held closed on the electrode holder handle 12. This speed control is desirable, as is well known, or will be well understood by the trade, one operator counts time increments at a faster rate than another to gauge travel indicative of effect of amperage change at welding location. Also, the desired rate of change of amperage, differs at welding locations, in accordance with the exactment of various conditions, and with the individual practices of various operators.

Considering FIG. 4, the control housing 26 is viewed looking outwardly from the plane of hood side 25a, with part of the housing being cut away, mainly to show mechanical part arrangement, also to demostrate that the control housing mounts panelboards, indicated as 36 and 38. The rear end of the shaft 27, that mounts the indicating arrow 28 on its forward end in FIG. 3, is not visible in FIG. 4, but a coupling element 37 is shown having a bore 37a therein that is in co-axial alignment rearwardly of the said shaft 27. As indicated, the coupling element 37 has longitudinally extending, alternating ridges 37b and grooves 37c peripherally thereabout, to serve in equally spaced apart camming operations with relation to electronic means, to be hereinbelow described. Opposed coupling lugs 37d are shown extending rearwardly from the rear face of the coupling element 37 for cooperation with conventional coupling members on the forward end of the hereinabove described, conventional cooperative extension of the shaft 27, thus to adjust delivered amperage, as aforesaid.

As shown in FIGS. 5 – 12, inclusive, broken line rectangular blocks are variously designated, as by S1 in FIGS. 5, and in FIGS. 9 – 12, inclusive; by switch circuit in FIGS. 6 – 7, inclusive, and also by reference numerals 35 in all of the FIGS. 5 – 12, inclusive. These designations are representative of the double action switch 20, hereinabove described, from which circuit is carried by respective conductors 34c, (shown below), and 34d, shown below), which these designations also include as comprised in the assembly they represent. In description of FIG. 3, it has been stated hereinabove that the conductor 34c is electrically tied to the welding lead 15a, while the conductor 34d is electrically tied to the opposite side of the double action switch 20.

The double action switch 20 common to each of the rectangular blocks designated by the reference numeral 35, is shown for purposes of illustration in detail in FIG. 6, with the toggle lever 20 indicated as being normally held at a neutral or off position. As moved leftward, FIG. 6, the double action switch, at farthrest leftward travel, closes circuit with a resistor circuit R1 that is connected to the hereinabove mentioned conductor wire or conductor 34d. This direction is designated INCR. or increase, as will be hereinbelow described. As moved rightward, FIG. 6, the double action switch, at farthrest rightward travel, closes circuit with the conductor 34d without the resistor R1 being in series therewith. This direction is designated DECR. or decrease, as will be hereinbelow described. The element designated M1 in FIGS. 5, 6, 9 and 10, and also designated MOTOR in FIG. 5, and also designated PERM. MAGNET D.C. MOTOR in FIG. 6, represents a fractional horse power motor that can be driven where there is a power source of not more than 12 volts, less being required for the actual driving of the motor M1. This motor M1 is designated in FIG. 4 as being disposed within the control housing 26 and through a mechanical transmission or "gear box" 39, it drives the shaft 27 which imparts rotation to the hereinabove rear extension thereof, to which it is coupled, to drive the conventional arm or means that changing the effective resistance of the welding machine rheostat, all as aforesaid. The conductors 34a, 34b, shown in FIG. 4 deliver the D.C. power from the conventional source, as from the said D.C. battery, to operate control circuitry as well as to drive the fractional motor M1, and these conductors 34a, 34b, connect into control circuitry within the control housing 26, at suitable points, as will be indicated hereinbelow.

Of the types of circuitry applicable to function upon selectively directional closure of the double action toggle type switch 20, FIGS. 1, 2 and 6, a form or preference of circuitry is shown in block diagram in FIG. 5. In this form, the conductor 34d, usually taped to the cable 15, or otherwise extended separately therefrom, extends into the control housing 26 to be connected into its circuitry in manner to connect into an Off-On DETECTOR circuit, with a SPEED CONTROL POTENTIOMETER next in series therewith, (knob 29, FIG. 3, as part thereof), and further in series, MOTOR DRIVE CIRCUIT, (to which the positive conductor from battery or source of power, is connected, as at V+. The aforesaid successively series connected rectangular blocks may be considered as solid state circuitry, while a next in succession high current REVERSING RELAY is included to respond to switch manipulation actuating change in direction of adjustment, the RELAY in turn being connected, for functioning, to the opposite sides of the fractional horse power motor M1. Parallel connection between switch S1 and OFF-ON DETECTOR, to the REVERSING RELAY is indicated, whereas the cable conductor connected wire 34c also extends to the REVERSING RELAY, and has a side of the OFF-ON DETECTOR connected thereto.

Referring now to FIG. 9, details of electrical operation are shown and set forth as to the above outlined simplest configuration of control circuit. When switch S1 is in its normal (center) position, the only circuit from base to emitter of transistor Q1 is through the coil of relay K1. No voltage is applied across this circuit, and therefore no collector current flows in Q1, and no voltage appears accross potentiometer R3. Transistor Q2 is also "off" and no voltage appears across the terminals of Motor M1.

If switch S1 is moved to the Increase position, a circuit is completed through resistor R1 and a current flows through R2 and the base-to-emitter junction of Q1. An additional current flows through the coil of K1, but the relative resistances of R1, R2, and the coil of K1 are such that the potential across the K1 coil is less than that required to actuate the relay. The emitter-to-collector circuit of Q1, which can be considered as a switch controlled by base-to-emitter current, is turned "on" and V+ voltage appears at the upper terminal of potentiometer R3.

An adjustable proportion of this voltage will appear at the moveable contact of R3, and will be applied to the base of Q2. This transistor is connected in an "emitter follower" configuration, in which the load resistance is connected between emitter and ground, and in which the voltage appearing at the load is essentially that appearing at the base of the transistor.

A voltage determined by the setting of R3 will therefore be conducted to and through the contacts of K1 and will cause rotation of M1 in a predetermined direction and at a rate determined by the voltage.

If switch S1 is moved to the Decrease position, conditions similar to those described will obtain, except that the full V+-to-ground voltage will be applied to the coil of K1. Thus relay will thus be actuated, and the polarity of voltage to M1 will be reversed by the connection of the relay contacts, reversing the direction of rotation.

FIG. 6 represents control circuitry, all of solid state elements, with the usually taped on conductor 34d connecting in series with OFF-ON DETECTOR, of high or low current capacity; followed in series by SPEED CONTROL POTENTIOMETER (in part includes knob 29, FIG. 3); then followed by DIRECTION SWITCHING CIRCUIT, which connects to MOTOR DRIVE (clockwise) and MOTOR DRIVE (counterclockwise) in parallel, the circuit blocks crossconnecting to junctions, one on positive side and one on negative side of the motor M1. The conductor 34c, from connection into cable conductor 15a near switch S1 or 20, connects into a cross-connection between the aforesaid OFF-ON DETECTOR a high current, REVERSING DETECTOR.

Cpntinuing block diagram circuitry of FIG. 6, a conductor from the conductor 34d adjacent the switch S1, connects into a high current REVERSING DETECTOR circuitry, thus placing the OFF-ON DETECTOR in parallel therewith. From the REVERSING DETECTOR there extends a conductor that ties into the DIRECTION SWITCHING CIRCUIT, hereinabove described. The conductors 34a, 34b, from the battery or source of power, are not shown in FIG. 6, as they connect with the block diagram circuitry but it can be assumed that positive connection may be made as between the DIRECTION SWITCHING CIRCUIT and MOTOR DRIVE (clockwise), whereas negative connection may be made suitably oppositely in FIG. 6.

Referring now FIG. 10, the circuitry shown in FIG. 6 is shown further in electrical detail, it being pointed out that this circuitry, all solid state, necessarily omits the electro-mechanical relay K1 shown in FIG. 9. In detail, as shown, when switch S1 is in its off position, Q3 and Q4 will both be in a non-conducting, or "off" condition, due to the fact that the transistor bases will return only to their emitters, through resistors R1, R4, R5, and R6. Under these conditions, collectors of Q3 and Q4 will remain at "ground" potential.

If S1 is moved to the Increase position, the relative resistance of R1, R4, R5, and R6 will be such as to produce a base-to-emitter current flow in Q3 but not in Q4, thereby bringing the collector potential of Q3 essentially to V+ but allowing the collector of Q4 to remain at ground potential. In effect, then, considering Q3 and Q4 as switches controlled by base-to-emitter currents, Q3 is on but Q4 is off.

If S1 is moved to the Decrease position, the resistances of R4, R5, and R6 allow current flow from base to emitter in both Q3 and Q4, in effect turning both transistor switches on.

Thus, it can be seen that Q3 is turned on when S1 is moved to either side of its center-off position, but that Q4 is turned on only in the position that provides a direct connection with the presence of R1 in the circuit. Q3 will be used to control the application of power to M1, and Q4 will be used to control the direction of rotation of M1.

From the collector of Q3, which assumes a potential of V+ when Q3 is on, potentiometer R7 is provided as a means of reducing this potential to a lower value in order to reduce the speed of M1 to any desired rate.

Direction switching is accomplished by the circuit including transistors Q5, Q6, Q7, and Q8. This circuit is used to route current flow from R7 to one or the other of two motor drive circuits, thereby determining direction of rotation of M1.

Under the condition where Q3 is on but Q4 is off, the base of Q5 will be at ground potential, but the base of Q6 will be at a potential determined by R13 and R14, which will cause a base-to-emitter current flow in Q6 in the absence of current flow in Q5. Q6 will thus be on, and its collector current through R12 will turn on Q8. Q7 will remain off.

Under the condition where both Q3 and Q4 are on, the collector current of Q4 flowing through R8 and R9 produces a higher voltage at the base of Q5 than that at the base of Q6. Ths, in turn, produces a higher voltate at emitter resistor R10 than that at the base of Q6, turning Q6 off while Q5 is turned on. As a result, Q5 collector current through R11 will turn on Q7, and Q8 will be off.

As a result of the conditions described, a voltage will appear at the collector of either Q7 or Q8, approximately equal to the voltage at the movable contact of R7. In the case where only Q3 is on and the voltage therefore appears at the Q8 collector, base current will flow in Q9 and in Q10 via R15, and these transistors will cause a voltage to appear across M1 to cause rotation in a predetermined direction. If, however, Q4 is on as well as Q3, the voltage at the collector of Q7 will cause activation of Q11 and Q12 instead of Q9 and Q10, which will cause a voltage of opposite polarity across M1 and an opposite rotation.

In the case of the two transistors Q9 and Q11, an "emitter follower" configuration is used, in which the voltage at the load is essentially that at the base of the transistor. It is by this means that the voltage at the motor, and its resultant speed, is determined by the setting of R7. Q10 or Q12 is used a simple switch to furnish a ground circuit to the side of M1 not being supplied by Q9 or Q11 at a given time.

Resistor R17 is of low resistance, and its function is to limit the maximum current in this circuit to a value which will not cause damage under certain transient conditions which can exist during switching. Due to the fact that various voltages exist within a system such as that of an electric arc welder, it is desirable that the control circuit comprising the switch and resistor and necessary wiring thereto be electrically isolated from all other electric circuits. Such isolation would permit accidental short circuits to any one point in the control circuit from any other electrical conductor in the system without damage to, or interference with the operation of, the control circuit. It would, alternatively, permit utilization of the welding cable proper as one conductor of the control circuit, if desired.

The circuitry hereinabove described in FIGS. 5 and 9, and also the circuitry hereinabove described in FIGS. 6 and 10, may be adapted so that the electrode lead or cable conductor 15a may serve from a point near the switch S1 or 20 to a point where the cable 15 is just outside the hood side 25a, as the conductor 34c has been described as serving in the several views hereinabove described. In this form of adaptation, the conductor 34c connects into, or terminates in the cable conductor 15a, and this reduces to a single wire in the form of a conductor 34d, the only separate communication between the switch 20 and control housing 26. This one wire adapter provides D.C. isolation to permit use of the welding cable as one conductor over practically all of the distance between switch S1 or 20 and the control housing 26. As shown in block diagram in FIG. 7 the conductor (single wire) 34d extends into the control housing where it includes the lower coil of a step-down transformer, then a D.C. BLOCKING CAPACITOR, then the lower coil of another step down transformer.

The conductor 34d, from the second low coil in transformer step-down, terminates by being electrically connected into the cable conductor 15a adjacent the welding machine hood 25. A separate source of power, as separately indicated at V+, V−, power the audio frequency oscillator. An AC to DC CONVERTER is interposed between the first transformer as the circuitry hereinabove described within the control housing 26. Thus an interposition of an alternating current system is required to protect the control circuit from any other electrical conductor system, as hereinabove stated by way of introduction.

FIG. 11 shows a method for accomplishing this by interposition of an alternating current system between the control switch S1 and the above described D.C. control system. Transformers and a capacitor are utilized to provide electrical isolation, and the alternating current is then converted to a direct current to activate the control circuitry in a manner identical to that above described.

Since the control system is normally powered by an external source of low-voltage d.c., the necessary a.c. may be supplied by an oscillator circuit included in the system. Any convenient frequency, such as one in the mid-audio range, can be utilized. A typical oscillator circuit which might be used is shown supplying power to transformer T1 in the figure.

In series with the secondary winding of T1 is a capacitor C1, to block the flow of any d.c., the primary winding of transformer T2, and the control switch S1 with its associated resistor R1 and the wiring thereto.

The secondary of T2 supplies power to a rectifier and filter, typified by diodes D1 and D2 and capacitor C2 in the figure. The d.c. voltage at C2 will be dependent upon the resistance in the a.c. circuit between the transformers, and will therefore be controlled by the position of switch S1. The operation of motor M1 will thus be controlled by S1 in the same manner as if the a.c. circuit had not been interposed.

In the case of both the circuitry shown in FIGS. 5 and 9; and in the case of the circuitry shown in FIGS. 6 and 8, adaptation can be made so that upon change motion, an audible series of sounds, as "beeps" at operator station, apprises the operator of the progress of change of delivered amperage. The circuitry for injecting this type of countable indicia is shown in FIG. 8 with a blocking capacitor between conductors 34d, 34c, just adjacent the switch circuitry 35. Then, at station, a low impedance earphone is provided, which includes the ear insert or head phone in series in the conductor 34d. A transformer secondary in the conductor 34d within the control housing 26 receives power from the transformer primary of an audio oscillator.

A switch operated by a cam 37 (coupling element, FIG. 4), makes and breaks circuit in a 12 volt positive line, alternating passing current through a discharge resistor, or directing build up against an electrolytic capacitor. Whereby, upon capacitor discharge signals are transmitted by the AUDIO OSCILLATOR to be reflected as "beeps" in the earphone or headphone of the operator. This modification is inserted between the normal control circuitry, hereinabove described, with relation to the form of invention shown in FIGS. 5 and 9, and also with relation to the form of invention shown in FIGS. 6 and 10.

Figure 12:
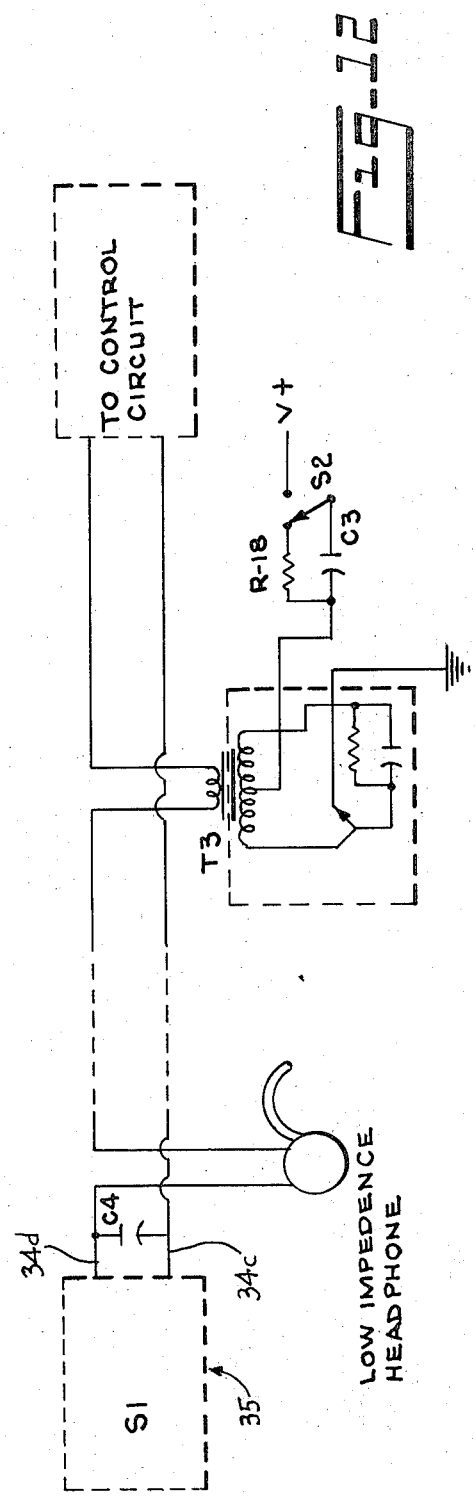
FIG. 12 is an electrical detail diagram of the circuitry shown in block diagram in FIG. 8.

FIG. 12 sets forth in circuitry detail, how the performance hereinabove described with relation to the block diagrams of FIG. 11, may be accomplished. In this figure, a means is clearly shown in circuitry by which the operator may have an audible indication of the degree of rotation he has effected in the control motor.

S2 is a switch operated by a cam attached to the motor shaft, and which opens and closes at regular intervals of rotation of the motor. The object is to provide the operator with an audible tone of short duration each time S2 is operated by the motor.

A typical audio oscillator circuit which might be used is shown connected to the primary of transformer T3 in the figure. The oscillator is supplied with operating power only momentarily when S2 operates to the V+ position, due to the charging current of capacitor C3. When S2 returns to its original position, R18 quickly discharges. C3 in readiness for its next operation.

The value of C3 is such as to charge in a fraction of a second, and a short "peep" tone will be heard in a headphone connected in the secondary circuit of T3.

The d.c. resistance of the T3 secondary winding is sufficiently low that it may be inserted in series with a connecting wire to switch S1 without interfering with the normal operation of the control circuit. Similarly, the resistance of headphone H1 is low.

Capacitor C4 is placed across the S1 circuit so that the volume of the tone will not be reduced by the resistance of R1 when S1 is in the increase position.

The invention is subject to considerably more useages, adaptations and variations. For instance music may obviously be switched in when an operator is not sensing adjustment by counting "beeps." Also, the invention is not limited by any sense to welding operations because welding has been generally employed as illustrative of the practice of the inventions.

In effect the invention is only limited by the broad spirit thereof, with the multiple variations set forth only by way of example. Also the appended claims are by way of illustration and example.

I claim:

1. The combination of a power delivered source with power conduction means extendable to selective operative stations spaced therefrom, control circuitry housed to extend from said power delivering source, operator responsive means with operator changing means within said source, operator responsive means with operator at selective stations of operation and adapted to actuate control circuitry actuator means at said source to adjust change in power delivered, said control circuitry including solid state circuits and a relay circuit to reverse direction of change in power delivered, and also including means permitting D. C. isolation and permitting a single conductor to carry successively selectively directed signal responsive to operator actuation of control circuitry actuator means.

2. The combination of a power delivered source with power conduction means extendable to selective operative stations spaced therefrom, control circuitry housed to extend from said power delivering source, operator responsive means with operator at selective stations of operation and adapted to actuate control circuitry actuator means at said source to adjust change in power delivered, said control circuitry comprising solid state circuitry including solid state circuitry to reverse direction in change of power delivery, and additionally including means permitting D. C. isolation and permitting a single conductor to carry successively selectively directed signal responsive to operator actuation of control circuitry actuator means.

3. The combination of a power delivered source with power conduction means extendable to selective operative stations spaced therefrom, control circuitry housed to extend from said power delivering source, and co-axial with power changing means within said source, operator responsive means with operator at selective stations of operation and adapted to actuate control circuitry actuator means at said source to adjust change in power delivered, said control circuitry including solid state circuits and a relay circuit to reverse direction of change in power; and means set operative by said operator responsive means to provide audible sensing to operator of change in delivery of power.

4. The combination of a power delivered source with power conduction means extendable to selective operative stations spaced therefrom, control circuitry housed to extend from said power delivering source, and co-axial with power changing means within said source, operator responsive means with operator at selective stations of operation and adapted to adjust control circuitry actuator means at said source to adjust change in power delivered, said control circuitry comprising solid state circuitry to reverse direction in change of power delivery; and means set operative by said operator responsive means to provide audible sensing to operator of change in delivery of power.

5. A welding machine to deliver power through cables means including an electrode holder held by an operator to actuate actuation circuitry in an included control housing extending co-axially from machine included means adapted to effectuate change of power delivery by said machine, said actuation circuitry including solid state circuits and a relay circuit to reverse direction of change in power delivered, and additionally including means permitting D. C. isolation and also permitting a single conductor to carry successively selectively directed signal responsive to operator actuation of control circuitry actuator means.

6. A welding machine as claimed in claim 5, in which said actuation circuitry drives a fractional horse power motor within said control housing to effectuate change of power, as aforesaid.

7. A welding machine as claimed in claim 5, in which said actuation circuitry includes manually operable means to change rate of change of delivery of power.

8. A welding machine to deliver power through cables means including an electrode holder held by an operator at selectively spaced stations therefrom, switch means on said holder and operable to actuate actuation circuitry in an included control housing extending co-axially from machine included means adapted to effectuate change of power delivery by said machine, said actuation circuitry comprising solid state circuitry to reverse direction in change of power delivery, and additionally including means permitting D.C. isolation and also permitting a single conductor to carry successively selectively directed signal responsive to operator actuation of control circuitry actuator means.

9. A welding machine to deliver power through cables means including an electrode holder held by an operator at selectively spaced stations therefrom, switch means on said holder and operable to actuate actuation circuitry in an included control housing extending co-axially from machine included means adapted to effectuate change of power delivery by said machine, said actuation circuitry comprising solid state circuits and a relay circuit to reverse direction of change in power delivered; and means set operative by said operator responsive means to provide audible sensing to operator of change in delivery of power.

10. A welding machine to deliver power through cables means including an electrode holder held by an operator at selectively spaced stations therefrom, switch means on said holder and operable to actuate actuation circuitry in an included control housing extending coaxially from machine included means adapted to effectuate change of power delivery by said machine, said actuation circuitry comprising solid state circuitry including solid state circuitry to reverse direction of power delivery; and means set operative by said operator responsive means to provide audible sensing to operator of change in delivery of power.

11. The method of setting in motion change of power delivered to selective points of operation by an operator at such a point, comprising the steps of, while continuing operation, successively actuating means in selectively directed manner on operative means to set in motion change of power delivered in selected direction, from a spaced source for operations at such point, sensing the change effected, and discontinuing actuation of said means on operative means.

12. The method of setting in motion change of power delivered to selective points in operation by an operator at such a point, comprising the steps of, while continuing operation, acutating means on operating means to set in motion change of power delivered from a spaced source of operations at such point, sensing the change effected, discontinuing actuation of said means on operative means, sensing of change being effected by count of "beeps," and when not sensing, operators enjoying non-sensing intervals by listening to music selectively supplied alternatively with "beeps."

* * * * *